United States Patent [19]

Aishima et al.

[11] 4,004,071

[45] Jan. 18, 1977

[54] PROCESS FOR THE POLYMERIZATION OF ETHYLENE

[75] Inventors: Itsuho Aishima, Fujisawashi; Hisaya Sakurai, Kurashikishi; Yukichi Takashi, Kurashikishi; Hideo Morita, Kurashikishi; Tadashi Ikegami, Kurashikishi; Toshio Sato, Kurashikishi, all of Japan

[73] Assignee: Asahi Kasei Kogyo Kabushiki Kaisha, Osaka, Japan

[22] Filed: Apr. 17, 1975

[21] Appl. No.: 569,044

[30] Foreign Application Priority Data

Apr. 30, 1974 Japan .............................. 49-47512
June 13, 1974 Japan .............................. 49-66514
June 17, 1974 Japan .............................. 49-68135

[52] U.S. Cl. .......................... 526/116; 252/429 C; 526/122; 526/127; 526/144; 526/151; 526/153; 526/348; 526/350; 526/352

[51] Int. Cl.² ...................... C08F 4/66; C08F 10/02

[58] Field of Search ............... 252/429 C; 260/88.2, 260/94.9 E; 526/116, 122, 127, 144, 151, 153

[56] References Cited

UNITED STATES PATENTS 3,737,393 6/1973 de Vries .................. 260/94.9 E

FOREIGN PATENTS OR APPLICATIONS 2,209,874 10/1972 Germany

Primary Examiner—Edward J. Smith
Attorney, Agent, or Firm—Burgess, Dinklage & Sprung

[57] ABSTRACT

Polyethylene or copolymers of ethylene with another α-olefin can be produced by the use of a novel polymerization catalyst obtained by using, in combination, (A) a specified, hydrocarbon-insoluble solid component prepared by reacting (i) a specific, hydrocarbon-soluble organoaluminum-magnesium complex $(Al_nMg_mR_{n(3-\alpha)}{}^1\text{-}R_{2m}{}^2H_u$, wherein $R^1$ and $R^2$ are hydrocarbon radicals) with (ii) a titanium or vanadium compound containing halogen atom(s), and (B) an organoaluminum compound. This catalyst exhibits a surprisingly high activity per the unit amount of the solid component.

14 Claims, No Drawings

PROCESS FOR THE POLYMERIZATION OF ETHYLENE

DESCRIPTION OF THE INVENTION

This invention relates to a process for polymerizing ethylene and for copolymerizing ethylene with another α-olefin. More particularly, it relates to a process for the low-pressure polymerization of ethylene in the presence of a novel catalyst prepared by the use of an organo-aluminum-magnesium complex compound.

In connection with the process for producing polyethylene in the presence of a catalyst consisting of a transition metal compound belonging to Groups IV–VI A in the Periodic Table and an organometallic compound of a metal belonging to Groups I–III in the Periodic Table, numerous catalysts have been developed and proposed since the invention of Ziegler catalyst. Most of these catalyst systems are, however, deficient in activity and moreover a process is necessary to remove the catalyst from the resultant polymer and this renders the catalyst more costly.

Recently, there have also been extensively developed highly active catalysts from the viewpoint of omitting the catalyst removal step, simplifying the manufacturing process and reducing the catalyst cost.

The catalyst system referred to as highly active catalyst is broadly classified into two groups: the so-called supported catalyst resulting from synthesis of a Ziegler catalyst supported on a solid surface; and a catalyst system using, in combination, a solid component obtained by reducing a titanium or vanadium compound with a specific organometallic compound and a specific organometallic activating agent. Regarding the above-mentioned supported catalyst, it has been found that a lot of systems utilizing a support, a halide, hydroxyhalide, alkoxide or organic acid salt of magnesium show an exceptionally high activity. (For example, Japanese Patent Publication Nos. 13050/1968, 42137/1972 and 42039/1972 and Japanese Patent laid open No. 5941/1972.

Referring to the catalyst system using, in combination, a specific organometallic compound and a transition metal compound, the followings have been known as highly active catalysts: a catalyst using a solid component prepared by reacting a reaction product of $R_2Mg$ with a halogenated aluminum compound, a Grignard reagent or a $RMg(OR')$ compound, with a transition metal compound (for example, Japanese Patent Publication 40959/1972 and British Pat. No. 1299862 and German Patent application laid-open No. 2,209,874); a catalyst using a solid component obtained by reacting a specific organoaluminum compound and a titanium compound (Japanese Patent Publication No. 26380/1972); a catalyst using a solid component containing titanium and vanadium compounds (for example, Japanese Patent Publications 28708/1972 and 28709/1972); etc. These catalysts each show a satisfactory activity per the unit amount of the transition metal but not a sufficiently high activity per the unit amount of the solid component.

Thus, in case of a process wherein the catalyst removal step is omitted, various problems such as the deterioration of polymer due to the halogen remaining therein, the corrosion of manufacturing equipment, etc., have not been completely solved.

We have advanced our extensive and intensive studies of the catalyst having a high activity per the unit amount of the solid component and have found that a surprisingly highly active catalyst is obtainable by using, in combination, a specified solid component prepared by reacting a specific organoaluminum-magnesium complex with a titanium or vanadium compound, and an organoaluminum compound.

The process according to this invention involves polymerizing ethylene, or ethylene and another olefin using a catalyst obtained by reacting a hydrocarbon-soluble complex compound containing aluminum and magnesium (1), represented by the general formula $$Al_nMg_mR^1{}_{n(3-\alpha)}R^2{}_{2m}H_{n\alpha}$$

wherein $R^1$ and $R^2$ are the same or different hydrocarbon radicals each containing 1–10 carbon atoms, $n$ and $m$ are numbers greater than zero and $m/n$ is a number within the range of 0.5–10, and $\alpha$ is a number of 0 or 1, with one kind or two kinds or more selected from the group consisting of titanium compounds and vanadium compounds both containing at least one halogen atom (2), and subsequently reacting the resultant hydrocarbon-insoluble reaction product (A), with an organoaluminum compound (B) represented by the general formula $$AlR^3{}_pX_{3-p}$$

wherein $R^3$ is a hydrocarbon radical containing 1–20 carbon atoms, X is a member selected from the group of hydrogen, halogen, alkoxy, aryloxy and siloxy and $p$ is a number within the range of 2–3.

Among the organoaluminum-magensium complex compound represented by the general formula $Al_nMg_mR^1{}_{n(3-\alpha)}R^2{}_{2m}H_{n\alpha}$ which is one component of the catalyst according to this invention, a compound having a value of $\alpha$ of zero is a known compound disclosed in Deutches Patentamt Auslegeschrift 2232685 and ANNALEN DER CHEMIE, 605, 93–97, 1957. Moreover, the process for polymerizing an olefin and diene using a catalyst consisting of said complex and titanium tetrachloride has been disclosed in the above-cited application. As stated above this combined catalyst cannot provide a sufficient activity per the unit amount of the transition-metal solid catalyst component to attain high activity called for from the industrial standpoint. As illustrated in Reference Example 1, the catalyst system using said two components as given in the above application exhibits an activity less than one-tenth that of the catalyst according to this invention. The complex having a value of $\alpha$ of 1 in the above-mentioned general formula is a novel complex discovered by us and gives various superior effectivenesses compared with the complex having a value of $\alpha$ of zero.

According to the present invention, it has been successful to realize an unexpectably high activity by reacting this specific organoaluminum-magnesium complex and a titanium and/or vanadium compound under definite conditions and further by reacting the resultant specific solid catalyst component with a specific organoaluminum compound. When the polymerization of ethylene is carried out as an example, the catalyst activity can exceed 30,000 grams per gram of solid catalyst per hour per $Kg/cm^2$ of ethylene pressure, which is a much higher value than any reported values for other catalysts that have ever been known. According to those patents relating to highly active catalysts that have been disclosed (for example, Japanese Patent Publications 42137/1972, 42039/1972 and 40959/1972), values are only in the range of 2,000–5,000 except 10,000 for one example. It may be apparent, therefore, that the catalyst according to this invention is utterly unpredictably surprising in performance as compared to conventional ones. In the manufacturing process which uses the catalyst in accordance with this invention, it is easy to produce polyethylene polymers which have the molecular weights desirable from the industrial viewpoint, by using the molecular weight controller such as hydrogen, etc.

The above-mentioned organoaluminum-magensium complex (component 1) having the general formula $Al_nMg_mR^1_{n(3-\alpha)}R_{2m}^2H_{n\alpha}$ which is used for synthesizing the catalyst according to this invention will be described. It is an inert-hydrocarbon-solvent-soluble complex compound which is synthesized by reacting an organoaluminum compound represented by the general formula $AlR_3^1$ or $AlR_2^1H$ and an organomagensium compound represented by the general formula $MgR_2^1$ or $R^2MgX$ wherein X is halogen (see, Deutsches Patentamt Auslegschrift 2232685, and ANNALEN DER CHEMIE 605, 93 (1957). The structure of said complex is not evident, but the compound is assumed to be a single complex or mixture thereof consisting of aluminum and magnesium components, considering from the fact that $R_2Mg$ is insoluble in a hydrocarbon solvent whereas said complex compound is soluble in that solvent. As the result of confirmation of synthesis components, the complex compound described above may be expressed by the empirical formula $(AlR^1_{3-\alpha}H_\alpha)_n(MgR_2^2)_m$ and it is believed that an exchange reaction takes place among the hydrocarbon radical(s) and hydrogen atom(s) bonded to aluminum and the hydrocarbon radical(s) bonded to magnesium. The hydrocarbon radical containing 1–10 carbon atoms, represented by the general formula $R^1$ is alkyl and is preferably methyl, ethyl, n-propyl, isopropyl, n-butyl, isobutyl, secondary butyl, tertiary butyl, amyl, hexyl, octyl or decyl. The hydrocarbon radical containing 1–10 carbon atoms, represented by the general formula $R^2$, is alkyl or aryl, and methyl, ethyl, n-propyl, n-butyl, amyl, hexyl, octyl or phenyl is a suitable radical. From the points of easiness for the preparation of the compound and high efficiency of catalyst, it is particularly preferable that the number of carbon atoms of hydrocarbon radicals $R_1$ and $R_2$ is 2–6.

The ratio of magnesium to aluminum, $m/n$, is particularly important for obtaining an active solid component of the present invention. It is inferred to be necesasary that the complex participates in the reaction in liquid state under the reaction conditions hereinafter defined in order to obtain the active solid component of the present invention. This fact seems to have something to do with the stability of the complex in the state of solution. The presence of a suitable amount of aluminum component is important for it. It is difficult to synthesize a complex having a large value of $m/n$. Even when it is synthesized, the stability of the product is low and the reproducibility of synthesis of solid component is bad. In the range where $m/n$ is small, the activity is reduced to a large extent. It is presumed that such reduction may be due to a fact that, in case of the small ratio, the stability of the complex in its dissolved state becomes inferior and also the participation of aluminum component becomes greater. For example, in the case of a complex synthesized from di-n-butylmagnesium and triethyl-aluminum, if the ratio $m/n$ is less than one, precipitation begins to occur, and if the ratio is 0.5 or less, precipitation becomes particularly notable. As apparent from Examples 8–13 and Comparative Example 1 (Table 2) hereinafter described, if the ratio $m/n$ is less than 0.5, the activityis remarkably reduced. The desirable range of the ratio is 0.5–10, and more desirable range is 1–10 and preferably 2–8.

Among the above-mentioned complexes, those containing hydride are equivalent to those containing no hydride in the efficiency of catalyst, but from the point of easiness of production of the complex, uniform particle size of solid component synthesized therefrom, and better processability of continuous polymerization, the above-mentioned hydride-containing complex is preferable.

As the above-stated titanium and vanadium compounds (component 2) having at least one halogen atom, a halide, oxyhalide and alkoxyhalide or a mixture thereof, of titanium or vanadium, such as titanium tetrachloride, titanium tetrabromide, titanium tetraiodide, titanium tetrafluoride, ethoxytitanium trichloride, propoxytitanium trichloride, butoxytitanium trichloride, dibutoxytitanium dichloride, tributoxytitanium monochloride, vanadium tetrachloride, vanadyl trichloride, monobutoxyvanadyl dichloride, dibutoxyvanadyl monochloride or the like. Halides containing three or more halogen atoms are particularly preferable.

The reaction method between said organoaluminum-magnesium complex and said titanium and/or vanadium compound is important in exhibiting the effectiveness of the present invention. The reaction is effected at a temperature up to 100° C, preferably at 20° C or lower, in an inert reaction medium, e.g. aliphatic hydrocarbon such as hexane or heptane; aromatic hydrocarbon such as benzene, toluene or xylene; alicyclic hydrocarbon such as cyclohexane or methylcyclohexane. To ensure higher activity, it is recommended that the reaction ratio of two catalyst components is in the range of 0.05–50 mols, especially 0.2–5 mols of organoaluminum-magnesium complex per one mol in the total amount, of titanium or/and vanadium compound. For the number of moles for said organoaluminum-magnesium complex, the molar sum of aluminum and magnesium components is used. For example, for complex compound $AlMg_6(C_2H_5)_3(n-C_4H_9)_{12}$, 945 g corresponding to the molecular weight of this structural formula is equivalent to 7 mols. To attain a particularly higher catalyst activity, it is most desirable to employ a method in which reaction is carried out while the two kinds of catalyst components are simultaneously added to the reaction zone (simultaneous addition). The resultant hydrocarbon-insoluble reaction product may be used as it is, provided the reaction has been completed. It is desirable, however, to separate it from the reaction mixture to enhance the reproducibility of polymerization.

Further, by the use of a reaction product obtain by further reacting the reaction product of components (i) and (ii) obtained above, with a halogenated compound of aluminum, silicon, tin, titanium or vanadium, a catalyst which enables to produce a polymer having a more uniform particle size and a higher bulk density, can be prepared.

As for organoaluminum compound which is the other caralyst component of the catalyst of the present invention, organoaluminum compounds represented by the general formula $AlR_p^3X_{3-p}$ are used alone or in admixture. The hydrocarbon radical containing 1–20 carbon atoms, represented by $R^3$ in the above formula includes aliphatic, aromatic and alicyclic hydrocarbons. X represents hydrogen or halogen atom, alkoxy, aryloxy or siloxy group. $p$ is in the range 2–3. Recommended compounds include, for example, triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum, diethylaluminum hydride, diisobutylalaluminum hydride, dihexylaluminum hydride, dioctylaluminum hydride, diethylaluminum ethoxide, diisobutylaluminum ethoxide, dioctylaluminum butoxide, diisobutylaluminumoctyl oxide, diethylaluminum chloride, diisobutylaluminum chloride, dimethylhydrosiloxyaluminum dimethyl, ethylmethylhydroxiloxyaluminum diethyl, and combinations thereof.

Employing, in combination, said alkylaluminum compound and the aforesaid hydrocarbon-insoluble solid results in a highly active catalyst. To achieve a maximum activity, it is particularly preferable to use trialkylaluminum or dialkylaluminum hydride. When an electronegative group is introduced into trialkylaluminum or dialkylaluminum hydride, the activity tends to decrease but each product shows its characteristic behavior during polymerization. Thus it is possible to produce useful polymers under high activity of catalyst. For example, by combining X group, control of molecular weight becomes easier.

The reaction between catalyst components (A) and (B) in accordance with the invention may be conducted with the progress of polymerization by adding said both the catalyst components to the polymerization system and under the polymerization conditions, or otherwise in advance prior to the polymerization. The reaction ratio of the catalyst components is preferably 1–3,000 m mol of component (B) per gram of component (A).

Further, by using a catalyst obtained by reacting a halogenated hydrocarbon in addition to the components (A) and (B) of the present invention, it is possible to produce a polymer having a broad distribution of molecular weight which is suitable for flow, film or sheet molding.

Preferable halogenated hydrocarbons are those having one or more halogen atoms in one molecule; a ratio of the number of halogen atom to the number of carbon atom, of 2 or less; and the number of carbon atom of 2 or more. As for such halogenated hydrocarbons, 1,2-dichloroethane, 1,2-dichloropropane, 2,3-dichlorobutane, 1,1,2-trichloroethane, 1,2-dibromoethane, 1,2-dichlorohexane, 1,1,2,2-tetrachloroethane, etc. can be preferably used.

The effectiveness of the catalyst of the present invention i.e. an extremely high activity and a broad distribution of molecular weight can be exhibited only by using the hydrocarbon-insoluble solid of the present invention, and cannot be attained if other methods than the above-mentioned are employed. The amount of halogenated hydrocarbon used is in the range of 0.05–10 mols, preferably 0.1–1 mol, per mol of component (B).

As for the polymerization method, there are available the usual suspension-, solution-and gas phase-polymerizations. In the cases of suspension- and solution-polymerizations, the catalyst is introduced into a reactor together with a polymerization medium, e.g. aliphatic hydrocarbon such as hexane or heptane; aromatic hydrocarbon such as benzene, toluene or xylene; or alicyclic hydrocarbon such as cyclohexane or methylcyclohexane. Then, ethylene is added under a pressure of 1–30 kg/cm² in an inert atmosphere and allowed to polymerize at a temperature ranging from room temperature to 150° C. For gas phase polymerization, it is possible to carry out polymerization under the conditions of an ethylene pressure of 1–50 kg/cm² and a temperature in the range of room temperature to 120° and by using means such as fluidized bed, moving bed or mixing with a stirrer in order to give better contact of ethylene with a catalyst.

In order to adjust the molecular weight of the polymer, it is possible to add hydrogen or an organometallic compound which is liable to cause chain transfer. It is also possible to polymerize ethylene in the copresence of a monoolefin such as propylene, butene-1, hexene 1, and also polymerize propylene, with good efficiency, by using the catalyst according to this invention.

The following examples of preferred embodiments further illustrate the principle and practice of the invention.

The molecular weight (MW) in the examples was determined using the expression $(\eta) = 6.9 \times 10^{-4} MW^{0.67}$ (see, Journal of Polymer Science, 36, 91 (1959). The catalyst efficiency denotes the amount (g) of polymer produced per gram of solid component per hour per kg/cm² of ethylene pressure.

EXAMPLE 1

In a 500 ml flask were placed 13.8 g of di-n-butylmagnesium and 1.9 g of triethylaluminum together with 200 ml of n-heptane. Then, the mixture was reacted at 80° C for 2 hours. There was synthesized an organoaluminum-magnesium complex having the composition $AlMg_6(C_2H_5)_3(n-C_4H_9)_{12}$. In a 300 ml flask equipped with two dropping funnels and a stirrer from which moisture and oxygen had been removed by the replacement with dry nitrogen, there was placed 60 ml of n-heptane and the content was cooled to $-20°$ C. Then, a solution of 80 ml containing 40 m mol (5.4 g) of this complex in n-heptane and a solution of 80 ml containing 40 m mol of titanium tetrachloride in n-heptane were weighed each in a dropping funnel and both the components were added at the same time with stirring, uniformly at $-20°$ C over 2 hours and allowed to react at this temperature for 2 hours. The resultant hydrocarbon-insoluble solid was isolated and washed twice with 40 ml n-heptane each and dried to give 10.6 g of grey solid.

In a 5 liter autoclave having been evacuated to vacuum and nitrogen-substituted, were placed 5 mg of said pure hydrocarbon-insoluble solid reaction product and 1.5 m mol of triisobutylaluminum together with 3 liter of n-heptane previously dehydrated and degassed. While keeping the inner temperature of the autoclave at 85° C, under hyrogen was added up to 2.0 kg/cm² gauge pressure. Then ethylene was added up to a total gauge pressure of 6.0 kg/cm². While maintaining the total gauge pressure at 6.0 kg/cm² by adding additional ethylene to it, the polymerization was carried out for an hour. The yield of the polymer was 620 g and the molecular weight was 78,000. The catalytic efficiency was 31,000 grams per gram of solid component per hour per kg/cm² of ethylene pressure.

The ratio Mw/Mn of mean weight molecular weight (Mw) to mean number molecular weight (Mn) as measured according to gel permeation chromatograph method was 7.8. The ratio is employed as a measure of molecular weight distribution, and the higher its value, the broader the distribution.

REFERENCE EXAMPLE 1

2.5 m mol of an organoaluminum-magnesium complex having a composition of $AlMg_2(C_2H_5)_3(n-C_4H_9)_4$, prepared in the same manner as in Example 1, and one l of heptane were introduced into a 5 l autoclave and heated at 30° C. 1.0 m mol of titanium tetrachloride was then added thereto and the resulting mixture was stirred. Thereafter 2 l of heptane was further added, followed by heating at 85° C. Polymerization was carried out in the same manner as in Example 1 by the use of the catalyst thus obtained to give 720 g of a polymer. The resulting catalyst efficiency was 1,200 g/g TiCl$_3$.hour.ethylene 1 kg/cm².

EXAMPLES 2–7

Polymerization was carried out under the same polymerization conditions as in Example 1, by using as a catalyst, hydrocarbon-insoluble solids prepared by using components and conditions for catalyst preparation listed in Table 1 and organoaluminums as one component also listed in Table 1, to give results shown in Table 1. The organoaluminum-magnesium complex used was prepared by reacting di-n-butylmagnesium and triethylaluminum in the same way as in Example 1. In Examples 6 and 7, the reactor was particularly clean after polymerization.

The resulting complexes were reacted with titanium tetrachloride, in a mol ratio of 1:1, at −10° C and for 4 hours, in the same manner as in Example 1 to give hydrocarbon-insoluble solids. polymerization was carried out under the same polymerization conditions as in Example 1, using 5 mg of the resulting solid component and 2.4 m mol of trioctylaluminum, to give results shown in Table 2.

Table 2

|  |  | Polymerization result | | |
|---|---|---|---|---|
| Example | Al-Mg complex | Yield (g) | Molecular weight | Catalyst efficiency |
| 8 | $AlMg_{10}(C_2H_5)_3(n-C_4H_9)_{20}$ | 424 | 75,000 | 21,200 |
| 9 | $AlMg_8(C_2H_5)_3(n-C_4H_9)_{16}$ | 625 | 62,000 | 31,600 |
| 10 | $AlMg_4(C_2H_5)_3(n-C_4H_9)_8$ | 669 | 67,000 | 33,400 |
| 11 | $AlMg_2(C_2H_5)_3(n-C_4H_9)_4$ | 593 | 65,000 | 29,600 |
| 12 | $AlMg(C_2H_5)_3(n-C_4H_9)_2$ | 485 | 72,000 | 24,200 |
| 13 | $AlMg_{0.5}(C_2H_5)_3(n-C_4H_9)_1$ | 370 | 86,000 | 18,500 |
| Comparative example 1 | $AlMg_{0.33}(C_2H_5)_3(n-C_4H_9)_{0.66}$ | 110 | 97,000 | 5,500 |

EXAMPLE 14

An organoaluminum-magnesium complex having a composition of $AlMg_2(i-C_4H_9)_3(n-C_4H_9)_3$ was synthesized as in Example 1 by the reaction of triisobutylaluminum and di-n-butylmagnesium. Forty m mols of this complex and 40 m mols of vanadium tetrachloride were reacted as in Example 1 at 0° C for 4 hours to isolate 11.2 g of hydrocarbon-insoluble solid. Five mg of this solid and 1.5 m mol of triisobutylaluminum were used as a catalyst to carry out polymerization under the same condition as in Example 1 to give 512 g of polymer having a molecular weight of 112,000 with a catalyst efficiency of 25,600.

EXAMPLE 15

An organoaluminum-magnesium complex having a composition of $AlMg_3(CH_3)_3(C_5H_{11})_6$ was synthesized by the reaction of diamylmagnesium and trimethylaluminum as in Example 1. Thirty m mols of this complex and 40 m mols of vanadyl trichloride were reacted at 0° C for 3 hours according to the method as in Example 1 to give 9.6 g of hydrocarbon-insoluble solid.

Table 1

| | Catalyst | | | | | Polymerization result | | |
|---|---|---|---|---|---|---|---|---|
| | Hydrocarbon-insoluble solid | | | | | | | Catalyst efficiency g/g solid hour ethylene kg/cm² |
| Example | Al-Mg complex | Ti compound | Mol ratio Al+Mg/Ti | Temp. × time | Amount used (mg) | Organoaluminum component (amount used mmol) | Yield (g) | Molecular weight | |
| 2 | $AlMg_6(C_2H_5)_3(n-C_4H_9)_{12}$ | TiCl$_4$ | 0.7/1 | −5° C×4 | 5 | $Al(i-C_4H_9)_3$ (1.5) | 742 | 64,000 | 37,100 |
| 3 | " | " | 2/1 | −30° C×4 | 5 | $Al(C_8H_{17})_3$ (2.0) | 524 | 97,000 | 26,200 |
| 4 | $AlMg_3(C_2H_5)_3(n-C_4H_9)_6$ | " | 1/1 | −10° C×4 | 5 | $Al(C_6H_{13})_3$ (2.0) | 726 | 76,000 | 36,300 |
| 5 | $AlMg_2(C_2H_5)_3(n-C_4H_9)_4$ | " | 1/1 | −10° C×4 | 5 | $Al(C_6H_{13})_3$ (2.0) | 530 | 84,000 | 26,000 |
| 6 | $AlMg_6(C_2H_5)_3(n-C_4H_9)_{12}$ | " | 1/1 | −20° C×4 | 5 | $Al(i-C_4H_9)_{2.5}(OC_2H_5)_{0.5}$ (3.0) | 560 | 52,000 | 28,000 |
| 7 | " | " | 1/1 | −20° C×4 | 5 | $Al(i-C_4H_9)_{2.5}Cl_{0.5}$ (3.0) | 585 | 49,000 | 29,300 |

EXAMPLES 8–13 AND COMPARATIVE EXAMPLE 1

Organoaluminum-magnesium complexes shown in Table 2 were prepared from triethylaluminum and di-n-butyl-magnesium in isooctane as solvent, in the same manner as in Example 1.

Polymerization was carried out by using 5 mg of this solid and 3.0 m mols of tridecylaluminum under the same conditions with those of Example 14 to give 544 g of polymer having a molecular weight of 74,000 with a catalyst efficiency of 27,200.

EXAMPLE 16

An organoaluminum-magnesium complex having a composition of $AlMg_2(i-C_4H_9)_3(C_{10}H_{21})_4$ was synthesized by the reaction of triisobutylaluminum and decylmagnesium. Fourty m mols of this complex and 40 m mols of titanium tetrachloride were reacted at $-10°$ C for 4 hours in the same manner as in Example 1 to give 11.2 g of hydrocarbon-insoluble solid.

By using 5 mg of this solid and 1.5 m mol of triisobutylaluminum, polymerization was carried out under the same conditions as in Example 15 to give 330 g of polymer having a molecular weight of 76,000 with a catalyst efficiency of 16,500.

EXAMPLE 17

Polymerization was carried out by using the same catalyst and the same polymerization conditions as in Example 1 except that a gaseous mixture of ethylene-propylene containing 4% by volume of propylene was used instead of ethylene alone to give 746 g of polymer having a molecular weight of 38,000 with a catalyst efficiency of 37,300.

EXAMPLE 18

Polymerization was carried out by using the same catalyst and the same polymerization conditions as in Example 1 except that a gaseous mixture of ethylenebutene-1 containing 2% by volume of butene-1 was used instead of ethylene alone to give 715 g of polymer having a molecular weight of 28,000 with a catalyst efficiency of 35,800.

EXAMPLE 19–23

Polymerization was carried out under the same polymerization conditions as in Example 1, by using as a catalyst, 5 mg of hydrocarbon-insoluble solid prepared by using components and conditions for catalyst preparation listed in Table 3 and organoaluminum compounds as a component also listed in Table 3, to give results shown in Table 3.

The organoaluminum-magnesium complexes used herein were prepared in the same manner as in Example 1.

Table 3

| | Catalyst | | | | Polymerization result | | |
|---|---|---|---|---|---|---|---|
| | Hydrocarbon-insoluble solid | | | | | | |
| Example | Al-Mg complex | Ti, V compounds | Mol ratio Al+Mg/Ti+V | Temp. × time | Organoaluminum component (Amount used mmol) | Yield (g) | Molecular weight | Catalyst efficiency |
| 19 | $AlMg_6(C_2H_5)_3(n-C_4H_9)_{12}$ | $TiCl_4$ | 1/1 | $-20°$ C×4 | $Al(i-C_4H_9)_2H$ (1.5) | 605 | 69,000 | 30,300 |
| 20 | $AlMg_4(C_2H_5)_3(n-C_4H_9)_8$ | $TiCl_4$ | 0.8/1.0 | $-5°$ C×4 | $Al(C_2H_5)H$ (2.0) | 554 | 73,000 | 27,700 |
| 21 | $AlMg_2(i-C_4H_9)_3(n-C_4H_9)_4$ | $VCl_4$ | 1/1 | $0°$ C×4 | $Al(i-C_4H_9)_{2.5}H_{0.5}$ (1.5) | 592 | 96,000 | 29,600 |
| 22 | $AlMg_3(CH_3)_3(C_5H_{11})_6$ | Mixture of $VOCl_3$ and $TiCl_4$ (mol ratio, 1:2)* | 1/1 | $-20°$ C×4 | $Al(n-C_6H_{13})_2H$ (3.0) | 640 | 89,000 | 32,000 |
| 23 | $AlMg(i-C_4H_9)(n-C_6H_{13})_2$ | Mixture of $Ti(O-n-C_4H_9)Cl_3$ and $TiCl_4$ (mol ratio, 1:1) | 1/1 | $10°$ C×3 | $Al(i-C_3H_7)_2H$ (3.0) | 460 | 62,000 | 23,000 |

*Ratio of $VOCl_3$ to $TiCl_4$

EXAMPLES 24–33

Polymerization was carried out under the same polymerization conditions as in Example 1, by using as a catalyst, 5 mg of hydrocarbon-insoluble solids prepared by using components and conditions for catalyst preparation listed in Table 4 and organoaluminum compounds as a component listed in Table 4, to give results shown in Table 4. The organoaluminum-magnesium complexes used herein were prepared from a dialkylaluminum hydride and a dialkylmagnesium, in the same manner as in Example 1.

Table 4

| | Catalyst | | | | | Polymerization result | | |
|---|---|---|---|---|---|---|---|---|
| | Solid component | | | | | | | |
| Example | Al-Mg complex | Ti, V component | mol ratio Al+Mg/Ti+V | Temp. × time | Organoaluminum component (amount used mmol) | | Yield (g) | Molecular weight | Catalyst efficiency |
| 24 | $AlMg_6(C_2H_5)_2(n-C_4H_9)_{12}H$ | $TiCl_4$ | 1/1 | $-20°$ C×4 | $Al(i-C_4H_9)_3$ | (1.5) | 630 | 82,000 | 31,500 |
| 25 | $AlMg_3(i-C_4H_9)_2(n-C_4H_9)_6H$ | " | 1/1 | $-10°$ C×4 | $Al(i-C_4H_9)_2H$ | (1.5) | 605 | 76,000 | 30,300 |
| 26 | $AlMg_3(C_2H_5)_2(n-C_3H_7)_6H$ | " | 2/1 | $-30°$ C×4 | $Al(i-C_4H_9)_{2.5}Cl_{0.5}$ | (3.0) | 552 | 59,000 | 26,600 |
| 27 | $AlMg_2(C_2H_5)_2(n-C_4H_9)_4H$ | " | 0.8/1 | $10°$ C×4 | $Al(n-C_6H_{13})_3$ | (3.0) | 490 | 86,000 | 24,500 |
| 28 | $AlMg_6(C_2H_5)_2(n-C_4H_9)_{12}H$ | $VCl_4$ | 1/1 | $-20°$ C×4 | $Al(i-C_4H_9)_3$ | (1.5) | 515 | 98,000 | 25,800 |
| 29 | $AlMg_6(C_2H_5)_2(n-C_4H_9)_{12}H$ | Mixture of $VOCl_3$ and $TiCl_4$ (mol ratio 1:1) | 1/1 | " | $Al(i-C_4H_9)_3$ | | 713 | 112,000 | 35,700 |
| 30 | $AlMg_6(C_2H_5)_2(n-C_4H_9)_{12}H$ | $TiCl_4$ | 1/1 | " | $Al(i-C_4H_9)_3$ | | 735 | 105,000 | 36,700 |
| 31 | $AlMg_2(i-C_4H_9)_2(C_2H_5)_4H$ | " | 1/1 | " | $Al(i-C_4H_9)_{2.5}(OC_2H_5)_{0.5}$ | (3.0) | 578 | 62,000 28,900 | |
| 32 | $AlMg_3(C_2H_5)_2(C_5H_{11})_6H$ | " | 1/1 | $0°$ C×4 | $Al(C_8H_{17})_3$ | (3.0) | 530 | 95,000 | 26,500 |
| 33 | $AlMg(C_2H_5)_2(n-C_6H_{13})_2H$ | " | 1/1 | $-20°$ C×3 | $Al(C_{12}H_{25})_3$ | (3.0) | 425 | 73,000 | 21,300 |

EXAMPLES 34–37

Polymerizations were carried out under the same conditions as in Example 1 except that halogenated hydrocarbons shown in Table 5 were employed. The results are shown in Table 5. It is clear that polymers having higher ratios of Mw/Mn and also broader distributions of molecular weight than those of Example 1 could be obtained.

Table 5

| Example | Halogenated hydrocarbon | Amount used m mol | Results of polymerization | | | |
|---|---|---|---|---|---|---|
| | | | Yield g | Catalyst efficiency | Mw | Mw/Mn |
| 34 | 1,2-dichloroethane | 0.75 | 560 | 28,000 | 85,000 | 18 |
| 35 | 1,2-dichloropropane | 0.50 | 506 | 25,300 | 77,000 | 17 |
| 36 | 2,3-dichlorobutane | 1.00 | 426 | 21,300 | 105,000 | 19 |
| 37 | 1,1,2-trichloroethane | 0.25 | 410 | 20,500 | 93,000 | 20 |

EXAMPLE 38

Two grams of the hydrocarbon-insoluble solid synthesized in Example 1 was introduced into a 100 cc flask together with 30 ml of heptane, and 20 ml of titanium tetrachloride was added. Reaction was carried out at 100° C for 1 hour, followed by isolating the resulting solid component and washing with heptane.

Polymerization was carried out in entirely the same manner as in Example 5 except that 5 mg of the resulting solid was used, to give 575 g of polymer. The catalyst efficiency and molecular weight were 28,800 and 71,000, respectively. The resulting polymer powder was smaller in the amount of massive substance and more uniform than those in the case of Example 1.

EXAMPLE 39

Polymerization was carried out under the same conditions as in Example 24 and by the use of the same solid component as in Example 24, except that an organoaluminum compound having a composition of Al(i-C$_4$H$_9$)$_{2.5}$(OC$_6$H$_5$)$_{0.5}$ was used as component (B). Thus 548 g of polymer was obtained. The catalyst efficiency and molecular weight were 27,400 and 65,000, respectively.

EXAMPLE 40

Polymerization was carried out under the same conditions as in Example 24 and by the use of the same solid component as in Example 24, except that an organoaluminum compound having a composition of Al(C$_6$H$_{13}$)$_{2.50}$(OSiH.CH$_3$.C$_6$H$_{13}$)$_{0.50}$ was used as component (B). Thus 576 g of polymer was obtained. The catalyst efficiency and molecular weight were 28,800 and 61,000, respectively.

Reference Example 2

A n-heptane solution of an organoaluminum-magnesium complex having a composition of AlMg$_6$(C$_2$H$_5$)$_3$(n-C$_4$H$_9$)$_{12}$ (the concentration of the complex in n-heptane being one mol/l) was prepared from di-n-butylmagnesium and triethylaluminum, in the same manner as in Example 1. Forty ml of the resulting solution was introduced into a 300 ml capacity flask provided with two dropping funnels and a stirrer, and maintained at 80° C. Forty ml of a n-heptane solution of diethylaluminum chloride (concentration: 0.14 mol/l) was added through one of the dropping funnels, and heating was carried out for 1 hour. At the same time with the addition of diethylaluminum chloride, precipitation occurred to form a slurry state. After further adding 60 ml of n-heptane, the flask was cooled to −10° C. Eighty ml of a n-heptane solution containing 40 m mol of titanium tetrachloride was dropped over 2 hours through the other of the dropping funnels, and further, reaction was carried out at this temperature for 2 hours. The resulting hydrocarbon-insoluble solid was isolated, washed twice with 40 ml of n-heptane and dried, to give 9.6 g of a brown solid.

Polymerization was carried out as in Example 1, except that 5 mg of the solid thus obtained and 2.0 m mol of trihexylaluminum were used. Thus 128 g of polymer was obtained. The catalyst efficiency and molecular weight were 6,400 and 105,000, respectively.

What is claimed is:

1. A method for polymerizing ethylene or of ethylene and other olefin which comprises polymerizing said ethylene or a mixture of ethylene and other olefin with a catalyst obtained by reacting (A) a hydrocarbon-insoluble reaction product formed by reacting (i) a hydrocarbon-soluble complex containing Al and Mg, represented by the general formula

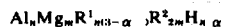

wherein R$^1$ and R$^2$ are same or different hydrocarbon radicals having 1 to 10 carbon atoms; n and m are numbers each greater than 0; m/n is in the range of 0.5–10; and α is 0 or 1, with (ii) at least one compound selected from the group consisting of titanium compounds and vanadium compounds both containing at least one halogen atom, with (B) a trialkylaluminum or a dialkylaluminum hydride wherein the alkyl radicals have 1 to 20 carbon atoms.

2. A method according to claim 1 wherein m/n is in the range of 1–10.

3. A method according to claim 1 wherein α is 1.

4. A method according to claim 1 wherein α is 1 and m/n is in the range of 1–10.

5. A method according to claim 1 wherein α is 1 and m/n is in the range of 2–8.

6. A method according to claim 1 wherein R$^1$ and R$^2$ each has 2–6 carbon atoms.

7. A method according to claim 1 wherein the compound of titanium or vanadium is selected from the group consisting of titanium tetrachloride, monoethoxytitanium trichloride, monopropoxytitanium trichloride, monobutoxytitanium trichloride, vanadium tetrachloride, vanadyl trichloride and mixtures of the foregoing.

8. A method according to claim 1 wherein the reaction of said organoaluminum-magnesium complex with the compound of titanium or vanadium is carried out at a temperature of 20° C or lower.

9. A method according to claim 1 wherein the reaction of said organoaluminum-magnesium complex with the compound of titanium or vanadium is carried out by simultaneously adding both the reactants to a reaction zone.

10. A method according to claim 1 wherein 0.2–5 mols of said organoaluminum-magnesium complex are reacted with one mol of the compound of titanium or vanadium.

11. A method according to claim 1 wherein 1-3,000 m mols of said organoaluminum compound are used per one gram of said organoaluminum-magnesium complex (i).

12. A method according to claim 1 including the further step of adding a halogenated hydrocarbon to the reaction product of (A) and (B) prior to polymerization.

13. A method according to claim 1 wherein the reaction product of (i) and (ii) is reacted with a halogenated compound of aluminum, silicon, tin, titanium or vanadium prior to reaction with (B).

14. A polymerization catalyst useful for polymerization or copolymerization of ethylene obtained by reacting (A) a hydrocarbon-insoluble reaction product formed by reacting (i) a hydrocarbon soluble complex containing Al and Mg, represented by the general formulas $$Al_n Mg_m R^1{}_{m3-\alpha} R^2{}_{2m} H_{n\alpha}$$

wherein $R^1$ and $R^2$ are the same or different hydrocarbon radicals having 1 to 10 carbon atoms; n and m are numbers each greater than 0; m/n is in the range of 0.5–10; and $\alpha$ is 0 or 1, with (ii) at least one compound selected from the group consisting of titanium compounds and vanadium compounds both containing at least one halogen atom, with (B) a trialkylaluminum or a dialkylaluminum hydride wherein the alkyl radicals have 1 to 20 carbon atoms.

* * * * *